United States Patent
Koenig et al.

(10) Patent No.: US 11,936,252 B2
(45) Date of Patent: Mar. 19, 2024

(54) EXCITER WINDINGS FOR WIDE SPEED OPERATION

(71) Applicant: Hamilton Sundstrand Corporation, Charlotte, NC (US)

(72) Inventors: Andreas C. Koenig, Rockford, IL (US); Dhaval Patel, Schaumburg, IL (US)

(73) Assignee: Hamilton Sundstrand Corporation (HSC), Charlotte, NC (US)

(*) Notice: Subject to any disclaimer, the term of this patent is extended or adjusted under 35 U.S.C. 154(b) by 78 days.

(21) Appl. No.: 17/370,851

(22) Filed: Jul. 8, 2021

(65) Prior Publication Data

US 2023/0012092 A1   Jan. 12, 2023

(51) Int. Cl.
*H02K 11/33* (2016.01)
*H02K 1/16* (2006.01)
*H02K 3/12* (2006.01)
*H02K 7/00* (2006.01)

(52) U.S. Cl.
CPC ............. *H02K 11/33* (2016.01); *H02K 1/16* (2013.01); *H02K 3/12* (2013.01); *H02K 7/003* (2013.01)

(58) Field of Classification Search
CPC . H02K 11/33; H02K 1/16; H02K 3/12; H02K 7/003; H02K 19/36; H02K 2213/09; H02K 19/32; H02K 19/38; H02K 19/26
See application file for complete search history.

(56) References Cited

U.S. PATENT DOCUMENTS

| | | | |
|---|---|---|---|
| 4,093,869 A | 6/1978 | Hoffmann et al. | |
| 4,305,001 A | 12/1981 | Vamaraju et al. | |
| 4,743,777 A | 5/1988 | Shilling et al. | |
| 9,729,096 B2 | 8/2017 | Edwards | |
| 10,131,441 B2* | 11/2018 | Edwards | B64D 27/02 |
| 10,723,469 B2* | 7/2020 | Patel | H02K 7/20 |
| 2004/0027078 A1 | 2/2004 | Xu et al. | |
| 2005/0184698 A1* | 8/2005 | Anghel | H02P 9/007 |
| | | | 318/715 |
| 2008/0303280 A1* | 12/2008 | Xu | H02P 9/302 |
| | | | 244/53 A |

(Continued)

FOREIGN PATENT DOCUMENTS

| | | |
|---|---|---|
| CN | 108923604 A | 11/2018 |
| DE | 2539169 A1 | 3/1977 |
| DE | 2935248 A1 | 3/1980 |

(Continued)

OTHER PUBLICATIONS

Extended European Search Report dated Nov. 24, 2022, issued during the prosecution of European Patent Application No. EP 22183882.4.

*Primary Examiner* — Bernard Rojas
(74) *Attorney, Agent, or Firm* — Locke Lord LLP; Joshua L. Jones; Gabriella D'Angelo

(57) ABSTRACT

An exciter comprises a stator armature defining a plurality of circumferentially spaced apart winding slots separated by respective stator teeth. first exciter winding with multiple phases, a second exciter winding with multiple phases. The individual windings of the first and second exciter windings are seated in the winding slots. For each phase of each of the first and second exciter windings there are two leads configured to connect to a generator control unit (GCU).

12 Claims, 3 Drawing Sheets

(56) References Cited

U.S. PATENT DOCUMENTS

2016/0336928 A1    11/2016   Kuznetsov

FOREIGN PATENT DOCUMENTS

| EP | 0237246 A2   | 9/1987  |
|----|--------------|---------|
| EP | 2523318 A2   | 11/2012 |
| GB | 1090376 A    | 11/1967 |
| WO | 2012062018 A1| 5/2012  |
| WO | 2014196975 A1| 12/2014 |

* cited by examiner

EXCITER WINDINGS FOR WIDE SPEED OPERATION

BACKGROUND

1. Field

The present disclosure relates generally to electrical machines, and more particularly to exciters for generators.

2. Description of Related Art

Commercial and military aircraft typically use a three-stage wound field synchronous generators for main electrical power generation. In some applications, the generator shaft speed can vary. At higher speeds, it becomes more difficult to control the generator output voltage because very small variations in the exciter field current can cause large variation in the generator's output voltage.

There is an ongoing need for improved control of generator output voltage over wider shaft speed ranges. This disclosure provides a solution for this need.

SUMMARY

An exciter comprises a stator armature defining a plurality of circumferentially spaced apart winding slots separated by respective stator teeth, a first exciter winding with multiple phases, and a second exciter winding with multiple phases. The individual windings of the first and second exciter windings are seated in the winding slots. For each phase of each of the first and second exciter windings there are two leads configured to connect to a generator control unit (GCU).

The first exciter winding can include individual windings only in a first sub-set of the winding slots, and the second exciter winding can include individual windings only in a second sub-set of the winding slots. In embodiments, every other winding slot in circumferential order can include windings of the first exciter winding and such that the windings slots that do not include windings of the first exciter winding include windings of the second exciter winding.

In certain embodiments, each winding slot can include windings of both the first exciter winding and of the second exciter winding. Each phase of each of the first and second exciter windings can include an insulated conductor to inhibit short-circuiting between the first and second exciter windings. In embodiments, the first and second exciter windings can be DC windings.

In accordance with another aspect of this disclosure, a generator system comprises a generator and a generator control unit electrically connected to the generator. The generator can include an exciter, a rectifier, and a main machine operatively connected to a rotating shaft, where the exciter includes a first exciter winding with multiple phases and a second exciter winding with multiple phases. The rectifier can be disposed between the exciter and the main machine. The rotating shaft can be operatively connected to a low pressure spool of a gas turbine engine to be to driven by the gas turbine engine.

A permanent magnet generator can be operatively connected to the rotating shaft and electrically connected to an input of the generator control unit, downstream of the main machine. The exciter can be electrically connected to an output of the generator control unit via at least one lead for each phase of each of the first and second exciter windings.

In embodiments, the main machine can be electrically connected to a power bus through a main machine output line. The generator control unit can include a rectifier, a power supply, a controller, and a converter, wherein the controller is configured to receive input from the main machine output line. The controller can be configured to switch between the first exciter winding and a second exciter winding for power conversion based on the input received from the main machine output line, wherein the first exciter winding is used at a first shaft speed and the second exciter winding is used at a second shaft speed, the first speed being different than the second speed.

In accordance with another aspect of this disclosure, a method of exciting a main machine in a generator system includes at first shaft speed, providing excitation from a first excitation coil of an exciter to a main machine, and at a second shaft speed above the first shaft speed, providing excitation from a second excitation coil of the exciter to the main machine.

The first and second excitation coils can both be incorporated in an exciter with its rotor connected to a rotating shaft that also turns a rotor of the main machine so the rotors of the exciter and main machine rotate at the same speed. At the first shaft speed, excitation is provided from both the first excitation coil and the second excitation coil to the main machine. The second speed to the first speed can be in ratio to one another at 6 or more to 1.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
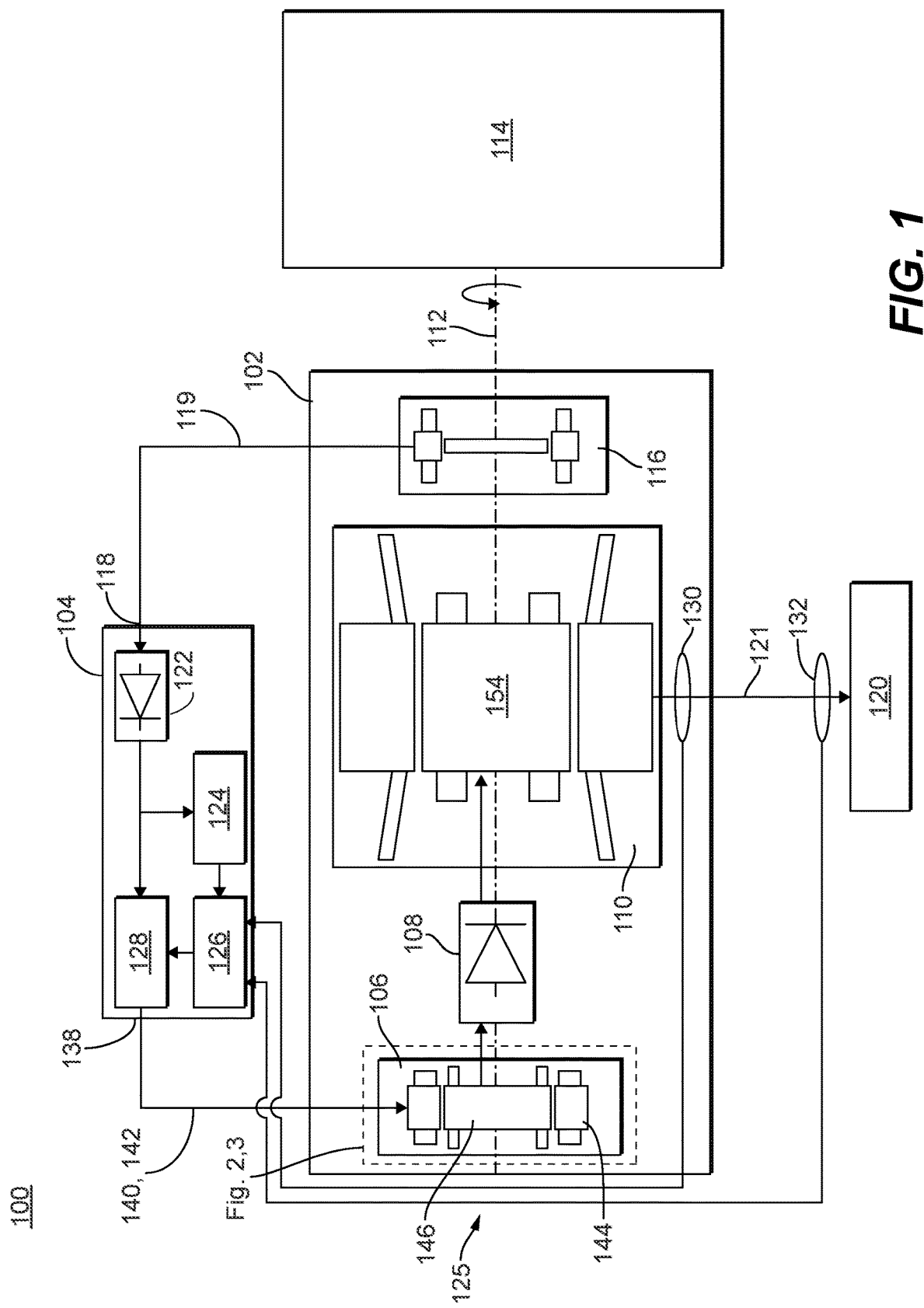
FIG. 1 is a schematic diagram of an embodiment of a generator constructed in accordance with the present disclosure, showing a connection between the generator and a generator control unit.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-3 as will be described. The systems and methods described herein can be used to maintain voltage control in a generator over a very wide speed range.

In accordance with at least one aspect of this disclosure, a generator system 100 comprises a generator 102 and a generator control unit 104 electrically connected to the generator 102. The generator can include an exciter 106, a rectifier 108, a main machine 110 and a rotating shaft 112. All of the exciter 106, rectifier 108, and main machine 110 can be operatively connected to the same rotating shaft 112. The rectifier 108 can be disposed between the exciter 106 and the main machine 110. In embodiments, the rotating shaft 112 can be operatively connected to a low pressure spool of a gas turbine engine 114 to be driven by the gas turbine engine 114.

A permanent magnet generator (PMG) 116 can be operatively connected to the rotating shaft 112 with the main machine 110. The PMG can be electrically connected to an input 118 of the generator control unit 104 via line 119. In embodiments, the main machine 110 can be electrically connected to a power bus 120 through a main machine output line 121.

The generator control unit 104 can include a rectifier 122, a power supply 124, a controller 126, and a converter 128 (e.g. DC to DC converter). The controller 126 is configured to receive input 125 from at least two leads 130, 132 on the main machine output line 121. Using the input 125, the controller 126 can switch between a first exciter winding 134 and a second exciter winding 136 for power conversion (e.g. as described further below). The first exciter winding 134 can be used at a first shaft speed and the second exciter winding 136 can be used at a second shaft speed where the first speed is different than the second speed. For example, switching can include, at low speed, switching so that alternate paths can be connected in series, while at high speed switching so that alternate paths can be connected in parallel or one path can be disconnected. In doing so, the same fine level of control can be exercised over the main machine 110 output (e.g. generator output to the aircraft) over a much wider range of shaft speeds than with just a single exciter winding and the switching in the generator control unit 104 alone.

Figure 2:
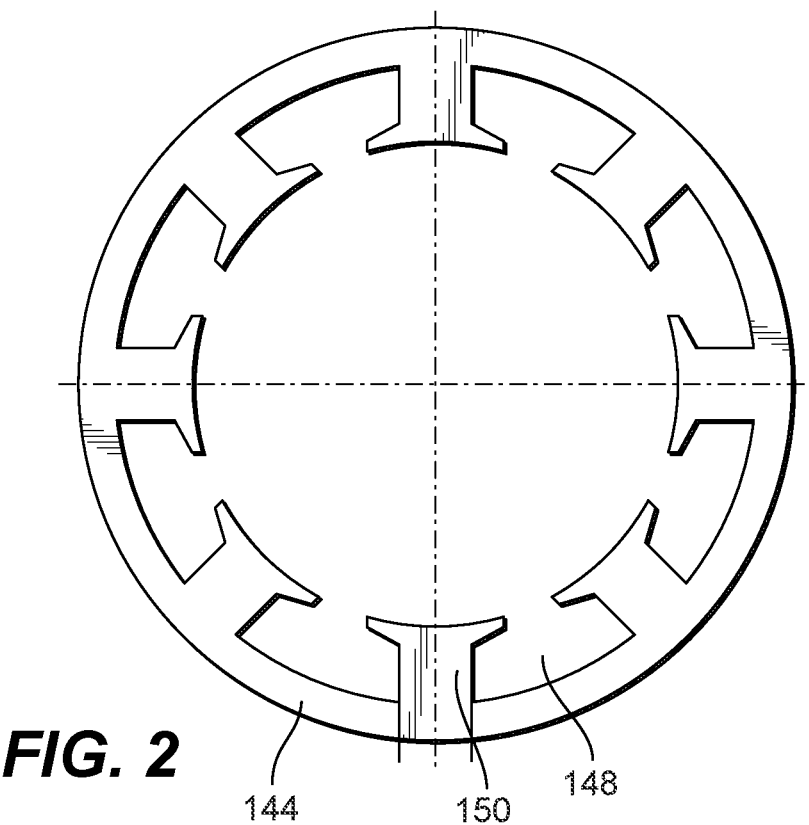
FIG. 2 is a schematic plan view of a stator armature of the generator of FIG. 1, having a plurality of winding slots.
Figure 3:
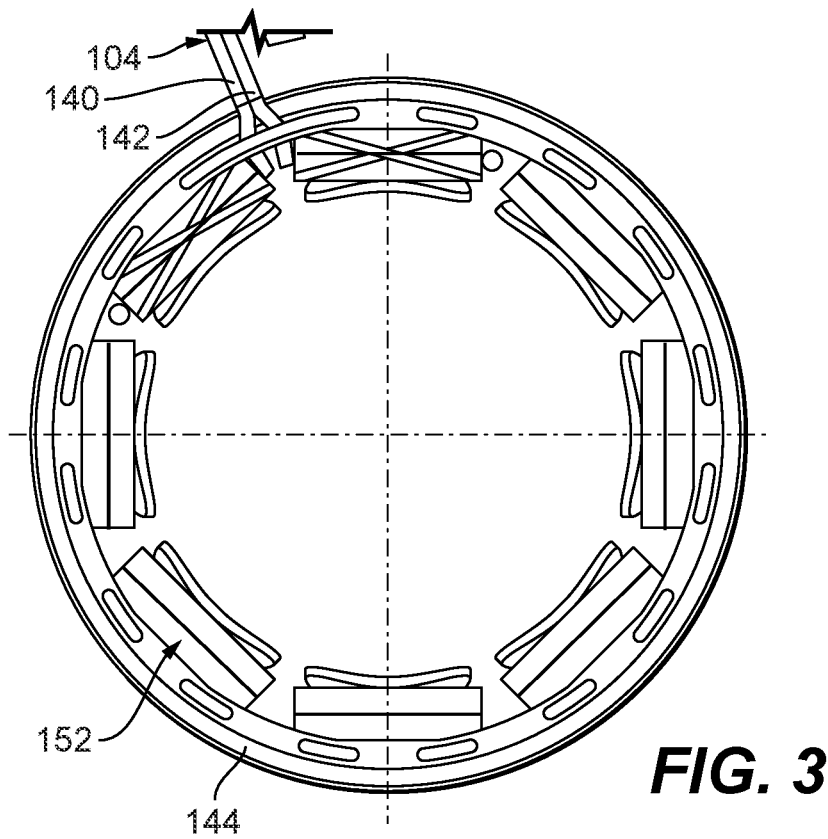
FIG. 3 is a schematic plan view of the armature of FIG. 2 showing a plurality of windings in the winging slots.

The exciter 106 can be a brushless electric machine and include a stator armature 144 and a rotor 146. As shown in FIGS. 2-3, the stator armature 144 defines a plurality of circumferentially spaced apart winding slots 148 separated by respective stator teeth 150. While eight winding slots 148 are shown, any suitable number of winding slots 148 can be used without departing from the scope of this disclosure. The first exciter winding 134 includes multiple phases and the second exciter winding 136 includes multiple phases, where individual windings of the first and second exciter windings 134, 136 are seated in the winding slots (e.g. as shown in FIG. 3). While two exciter windings are shown and described herein, it is appreciated by those skilled in the art any suitable number of additional exciter windings may be included.

Figure 4:
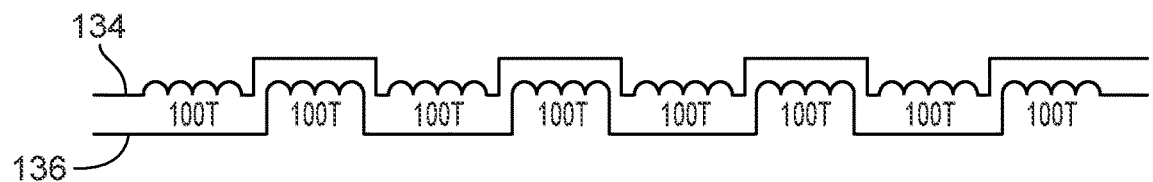
FIG. 4 is a schematic winding diagram for the generator of FIG. 1, showing which windings go in each of the winding slots of the armature of FIGS. 2-3.

For each phase of each of the first and second exciter windings 134, 136 there are two leads 140, 142 configured to connect the exciter to the generator control unit 104. With reference to FIG. 4 (where T is "turns"), the exciter windings are shown schematically in line format. The first exciter winding 134 can include individual windings (e.g. 100 turns) only in a first sub-set of the winding slots in any suitable pattern. The second exciter winding 136 can include individual windings (e.g. 100 turns) only in a second sub-set of the winding slots 148, where the windings of the second exciter winding 136 are only in those winding slots 148 which do not hold first exciter winding 134. For example, in embodiments, every other winding slot 148 in circumferential order can include windings of the first exciter winding 134, where the second exciter windings 136 can be included in the remaining winding slots 148, between first exciter windings 134.

Figure 5:
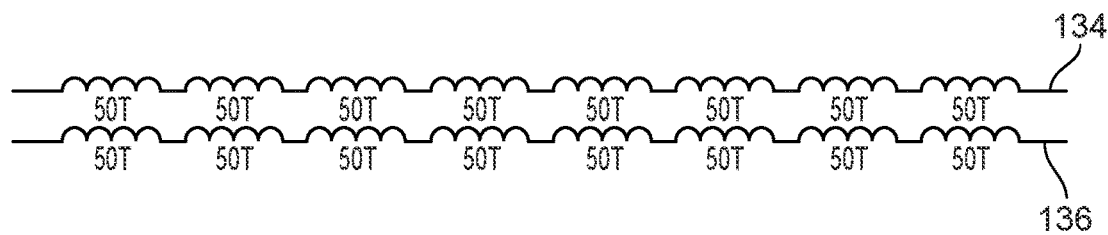
FIG. 5 is a schematic winding diagram for another winding embodiment for the generator of FIG. 1, showing which windings go in each of the winding slots of the armature of FIGS. 2-3.

In certain embodiments, for example in a 50 turn winding (as shown in FIG. 5, where T is "turns"), each winding slot 148 can include windings of both the first exciter winding and of the second exciter winding 134, 136. In this case, each phase of each of the first and second exciter windings 134, 136 can include an insulated conductor 152 to inhibit short-circuiting between the first and second exciter windings 134, 136. In embodiments, the first and second exciter windings 134, 136 can be DC windings, however, it is contemplated that the first and second exciter windings 134, 136 can be or include multiple AC windings.

In accordance with another aspect of this disclosure, a method of exciting a main machine 110 in a generator system 100 can include at first shaft speed, providing excitation from a first excitation coil 134 of an exciter 106 to the main machine 110, and at a second shaft speed above the first shaft speed, providing excitation from a second excitation coil 136 of the exciter 106 to the main machine 110. For example, at the first speed (e.g. low speed operation), the first exciter winding 134 can have a higher turns count and can be used by itself. At the second speed, (e.g. higher speeds), the second exciter winding 136 can be included in the winding set, or as subset of the first winding 136, where the winding as a whole includes fewer turns so that the a larger variation of exciter current is required to change the output voltage. The second speed to the first speed can be in ratio to one another at 6 or more to 1.

The first and second excitation coils can both be incorporated in the exciter 106 with its rotor 146 connected to a rotating shaft 112 that also turns a rotor 154 of the main machine 110 so that the rotors 146, 154 of the exciter 106 and main machine 110 rotate at the same speed. At the first shaft speed, the exciter coils can be tied in series so excitation can be provided from both the first excitation coil 134 and the second excitation coil 136 to the main machine 110. At the second shaft speed, the exciter coils can be tied in parallel, or only a single exciter coil can be used.

The methods and systems of the present disclosure, as described above and shown in the drawings, provide for variable speed wound field synchronous generator with a brushless exciter to maintain voltage control over a very wide speed range. Both windings can be used during a generate mode and can be optimized for different speed ranges of the generate mode, which can be particularly useful in generators that are driven by a low spool of a turbine engine where the speed range is the same or similar to that described herein. In the most general embodiment, they are both DC windings. While the apparatus and methods of the subject disclosure have been shown and described, those skilled in the art will readily appreciate that changes and/or modifications may be made thereto without departing from the scope of the subject disclosure.

What is claimed is:

1. An exciter comprising:
    a stator armature defining a plurality of circumferentially spaced apart winding slots separated by respective stator teeth;
    a first exciter winding, wherein individual windings of the first exciter winding are seated in the winding slots;

a second exciter winding, wherein individual windings of the second exciter winding are seated in the winding slots; and wherein for each phase of each of the first and second exciter windings there are two leads configured to connect to a generator control unit (GCU), wherein a main machine is electrically connected to a power bus through a main machine output line, wherein the generator control unit includes a power supply, a controller, and a converter, wherein the controller is configured to receive input from the main machine output line, wherein the controller is configured to switch between the first exciter winding and a second exciter winding for power conversion based on the input received from the main machine output line, wherein the first exciter winding is used at a first shaft speed and the second exciter winding is used at a second shaft speed, the first speed being different than the second speed.

2. The exciter as recited in claim 1, wherein the first exciter winding includes individual windings only in a first sub-set of the winding slots, and wherein the second exciter winding includes individual windings only in a second sub-set of the winding slots.

3. The exciter as recited in claim 2, wherein every other winding slot in circumferential order includes windings of the first exciter winding, and wherein windings slots that do not include windings of the first exciter winding include windings of the second exciter winding.

4. The exciter as recited in claim 1, wherein each winding slot includes windings of both the first exciter winding and of the second exciter winding.

5. The exciter as recited in claim 4, wherein each phase of each of the first and second exciter windings includes an insulated conductor to inhibit short-circuiting between the first and second exciter windings.

6. The exciter as recited in claim 1, wherein the first and second exciter windings are DC windings.

7. The exciter as recited in claim 1, wherein the first and second exciter windings are AC windings.

8. A generator system comprising:
a generator; and
a generator control unit electrically connected to the generator, the generator having an exciter, a rectifier, and a main machine operatively connected to a rotating shaft, the exciter including,
a first exciter winding with multiple phases and a second exciter winding with multiple phases, wherein the main machine is electrically connected to a power bus through a main machine output line, wherein the generator control unit includes a power supply, a controller, and a converter, wherein the controller is configured to receive input from the main machine output line, wherein the controller is configured to switch between the first exciter winding and a second exciter winding for power conversion based on the input received from the main machine output line, wherein the first exciter winding is used at a first shaft speed and the second exciter winding is used at a second shaft speed, the first speed being different than the second speed.

9. The generator system as recited in claim 8, wherein the rectifier is disposed between the exciter and the main machine.

10. The generator system as recited in claim 8, further comprising a permanent magnet generator operatively connected to the rotating shaft and electrically connected to an input of the generator control unit, wherein the permanent magnet generator is disposed downstream of the main machine.

11. The generator system as recited in claim 10, wherein the exciter is electrically connected to an output of the generator control unit via at least one lead for each phase of each of the first and second exciter windings.

12. The generator system as recited in claim 8, wherein the rotating shaft is operatively connected to a low pressure spool of a gas turbine engine to be driven by the gas turbine engine.

* * * * *